US005344694A

United States Patent [19]

Horie et al.

[11] Patent Number: 5,344,694

[45] Date of Patent: Sep. 6, 1994

[54] LIQUID DEVELOPER FOR ELECTROSTATIC PHOTOGRAPHY

[75] Inventors: Seiji Horie; Kenji Sano; Nobuo Suzuki; Syu Watarai, all of Kanagawa, Japan

[73] Assignee: Fuji Photo Film Co., Ltd., Kanagawa, Japan

[21] Appl. No.: 885,353

[22] Filed: May 19, 1992

[30] Foreign Application Priority Data

May 28, 1991 [JP] Japan ................................ 3-150898

[51] Int. Cl.[5] ................................ B32B 9/00

[52] U.S. Cl. ................................ 428/195; 430/49; 430/114; 430/115

[58] Field of Search ................ 430/49, 114, 115, 112; 428/195

[56] References Cited

U.S. PATENT DOCUMENTS

| | | | |
|---|---|---|---|
| 4,840,865 | 6/1989 | Kato | 430/115 |
| 4,842,975 | 6/1989 | Kato | 430/114 |
| 4,983,486 | 1/1991 | Kato | 430/115 |
| 5,082,759 | 1/1992 | Kato | 430/115 |
| 5,085,966 | 2/1992 | Suzuki et al. | 430/114 |
| 5,106,716 | 4/1992 | Kato | 430/115 |
| 5,112,716 | 5/1992 | Kato | 430/115 |
| 5,112,718 | 5/1992 | Kato et al. | 430/114 |
| 5,141,835 | 8/1992 | Kato | 430/49 |

OTHER PUBLICATIONS

Encyclopedia of Polymer Science & Engineering, vol. 7, pp. 572–573, 1985.

*Primary Examiner*—Patrick J. Ryan
*Assistant Examiner*—Patrick Jewik
*Attorney, Agent, or Firm*—Sughrue, Mion, Zinn, Macpeak & Seas

[57] ABSTRACT

A liquid developer for electrostatic photography, said liquid developer comprising resin particles dispersed in a non-aqueous solvent having a volume resistivity of at least $10^9$ Ωcm, said dispersed resin particles being obtained by polymerizing (a) at least one member of methyl methacrylate and ethyl methacrylate soluble in said non-aqueous solvent and (b) at least one member selected from the group consisting of acrylic esters and methacrylic esters having an alkyl group having not more than 4 carbon atoms, said esters being soluble in said non-aqueous solvent, but being made insoluble by polymerization, said components (a) and (b) being polymerized in the presence of a dispersion stabilizing resin which is soluble in said non-aqueous solvent, and said dispersion stabilizing resin comprising a graft copolymer formed by polymerizing (i) at least one member of macromonomers (M) having a weight-average molecular weight of $1\times10^3$ to $4\times10^4$, said macromonomers (M) having a polymerizable double bond containing group represented by the formula (I) defined in the specification bonded to one terminal of the main polymer chain, said macromonomers (M) containing at least one member of polymer components represented by formula (II) defined in the specification in the main chain thereof, and (ii) at least one member of monomers represented by formula (III) as defined in the specification, said monomers (a) and (b) being made insoluble by polymerization.

6 Claims, No Drawings

LIQUID DEVELOPER FOR ELECTROSTATIC PHOTOGRAPHY

FIELD OF THE INVENTION

This invention relates to a liquid developer for electrostatic photography and more particularly to a liquid developer for electrostatic photography for use in the making of a printing plate by using an original plate comprising an organic photoconductive compound layer provided on an electrically conductive substrate having a hydrophilic surface, forming a toner image with a liquid developer by electrophotography, fixing it and etching the plate with an aqueous alkaline etching solution to remove non-image areas other than image areas.

BACKGROUND OF THE INVENTION

Conventional printing plate materials (original plates for printing) which utilize electrophotography include zinc oxide-resin dispersion system offset printing materials described in JP-B-47-47610 (the term "JP-B" as used herein means an "examined Japanese patent publication"), JP-B-48-40002, JP-B-48-18325, JP-B-51-15766 and JP-B-51-25761. These printing plate materials are used after a toner image is formed by an electrophotographic process and the non-image areas are wetted with a desensitizing solution (e.g., an aqueous acid solution containing a ferrocyanate or a ferricyanate) to desensitize the areas. The thus processed offset printing plates have a printing durability of about 5,000 to 10,000 prints and are unsuitable for more printing. When the compositions of these plates are designed so as to be suitable for the desensitization processing, there are disadvantages that electrostatic characteristics are deteriorated and image quality becomes poor.

Many organic photoconductive material-resin system printing plate materials are known. Examples of such printing plate materials include those described in JP-B-37-17162, JP-B-38-7758, JP-B-46-39408, JP-A-52-24375 (the term "JP-A" as used herein means an "unexamined published Japanese patent application") and JP-B-2-46944. In these printing plates, a styrene-maleic anhydride copolymer, a vinyl acetate-crotonic acid copolymer, a vinyl acetate-maleic anhydride copolymer or a phenolic resin is used as a binder for organic photoconductive materials, said copolymers being soluble in alkalis and/or alcohols. The copolymer together with an organic photoconductive compound is coated on an electrically conductive metallic substrate such as an aluminum sheet to form a sensitive material. The material is subjected to a corona discharge treatment, an exposure treatment and a toner development processing to form a toner image. Non-image areas other than the toner image areas are removed by etching with an aqueous alkaline etching solution, whereby a printing plate can be made wherein the exposed areas on the hydrophilic metallic substrate, which are formed by etching, are non-image areas. As the organic photoconductive material-resin system printing plates according to this system, printing plates which are available under trade name of Elefasol from Curry Co., are put to practical use. However, the Elefasol system is a system wherein a toner image is formed with a dry developer. Even when fine toner grains are used as the dry developer, printing plates giving images having poor resolving power of only about 3 to 5 lines/mm can be obtained.

On the other hand, when a toner image is formed by using a liquid developer, there can be obtained an image having a resolving power of about 15 to 50 lines/mm.

When the liquid developer is used, a toner image excellent in resolving power can be obtained and a sharp image can be obtained. However, there are disadvantages that the thickness of the toner image is considerably thinner than that of the dry system image and the toner image is inferior to the dry system image in the property as a resist in etching solutions and as a result, the resulting printing plate has poor printing durability.

Generally, it is required that liquid developers for printing plates have such characteristics that the developers are excellent in dispersion stability, redispersibility and fixability in addition to the excellent property as a resist in the etching solutions. Many liquid developers for printing plates have been conventionally developed and proposed. However, the fact is that there is not proposed any liquid developer which is considered to have all of the desired characteristics with regard to resolving power, dispersion stability, redispersibility, fixability and the property as a resist.

SUMMARY OF THE INVENTION

An object of the present invention is to provide a liquid developer which forms a toner image having a resist with high fastness to aqueous alkaline etching solutions in the making of printing plates.

Another object of the present invention is to provide a liquid developer for the printing plates which has excellent dispersion stability and is good for long-term use and long-term storage.

Still another object of the present invention is to provide a liquid developer for the printing plates which is suitable for use in the making of lithographic plates for electrophotography which gives images having excellent resolving power, can well reproduce images and has good printing durability (printing impression).

The above-described objects of the present invention have been achieved by providing a liquid developer for electrostatic photography which is used in the making of a printing plate by using the original plate comprising an organic photoconductive compound containing layer provided on an electrically conductive substrate having a hydrophilic surface, forming a toner image with a liquid developer by electrophotography, fixing it and then etching the plate with an aqueous alkaline etching solution to remove non-image areas other than toner image areas, characterized by that the liquid developer contains at least resin particles dispersed in a non-aqueous solvent having a volume resistivity of at least $10^9$ Ωcm wherein the dispersed resin particles are resin particles dispersed in the non-aqueous solvent obtained by polymerizing (a) at least one member of methyl methacrylate and ethyl methacrylate soluble in said non-aqueous solvent and (b) at least one member selected from the group consisting of acrylic esters and methacrylic esters having an alkyl group having not more than 4 carbon atoms (the esters being soluble in the non-aqueous solvent, but being made insoluble by polymerization) in the presence of a dispersion stabilizing resin which is soluble in the non-aqueous solvent and which comprises a graft copolymer formed by polymerizing (i) at least one member of macromonomers (M) having a weight-average molecular weight of $1\times10^3$ to $4\times10^4$ wherein a group having a polymerizable double bond represented by the following general formula (I) is bonded to one terminal of the main polymer chain having at least one member of polymer components represented by the following general formula (II), and (ii) at least one member of monomers represented by the following general formula (III), the monomers (a) and (b) being made insolubilized by polymerization, whereby the resin particles are dispersed in the non-aqueous solvent.

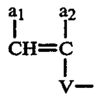

(I)

In general formula (I), V represents —COO—, —OCO—, $—(CH_2)_k—OCO—$, $—(CH_2)_k—COO—$, —O—, —CONHCOO—, —CONHNCO—, $—SO_2—$, —CO—, $—CONZ_1—$, $—SO_2NZ_1—$ or a phenylene group (a phenylene group is hereinafter represented by Ph, and Ph includes 1,2-, 1,3- and 1,4-phenylene groups); $Z_1$ represents hydrogen atom or a hydrocarbon group; k represents an integer of 1 to 3; $a_1$ and $a_2$ may be the same or different and each represents hydrogen atom, a halogen atom, cyano group, a hydrocarbon group, $—COO—Z_2$ or a group of $—COO—Z_2$ bonded through a hydrocarbon group; and $Z_2$ represents hydrogen atom or a hydrocarbon group which may be substituted.

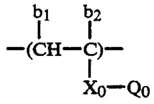

(II)

In general formula ( II ) , $X_0$ represents at least one bonding group selected from the group consisting of —COO—, —OCO—, $—(CH_2)_k—OCO—$, $—(CH_2)_k—COO—$, —O—, —CONHCOO—, —COHNCO—, $—SO_2—$, —CO—, $—CONZ_1—$, and $—SO2NZ_1—$ or a bonding group composed of a combination of two or more of them; $Z_1$ represents hydrogen atom or a hydrocarbon group; $b_1$ and $b_2$ may be the same or different and have the same meaning as $a_1$ and $a_2$ in general formula (I); k represents an integer of 1 to 3; and $Q_0$ represents an aliphatic group having 4 to 22 carbon atoms.

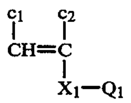

(III)

In general formula (III), $X_1$ has the same meaning as V in general formula (I); $Q_1$ represents hydrogen atom, an aliphatic group having 1 to 22 carbon atoms or an aromatic group having 6 to 12 carbon atoms; and $c_1$ and $c_2$ may be the same or different and have the same meaning as $a_1$ and $a_2$ in general formula (I).

In the component of general formula (II) for the macromonomer and in the monomer of general formula (III), at least one of $Q_0$ and $Q_1$ represents an aliphatic group having 4 to 22 carbon atoms.

DETAILED DESCRIPTION OF THE INVENTION

The non-aqueous solvent used in the liquid developer of the present invention is preferably a solvent having a volume resistivity of at least $10^9$ Ωcm and a dielectric constant of not higher than 3.

In the preparation of the copolymer resin particles to be contained in the liquid developer, there may be optionally used other monomers (c) copolymerizable with (a) at least one member of methyl methacrylate and ethyl methacrylate and (b) at least one member selected from the group consisting of acrylic esters and methacrylic esters having an alkyl group having not more than 4 carbon atoms. Examples of the monomers (c) include vinyl monomers having basic nitrogen atom or an amido group.

Examples of the vinyl monomers having basic nitrogen atom or an amido group include aminoalkylsubstituted (meth)acrylates represented by the following general formula (IV), quaternary salts of aminoalkylsubstituted (meth)acrylates represented by the following general formula (V), N-vinylimidazole, N-vinyl-2-methylimidazole, 1-vinylpyrrole, N-β-acryloxyethylindole, 2vinylquinoline, 4-vinylpyridine, 5-vinyl-4-methylthiazole, 3-methyl-5-isopropenylpyrazole, N-vinyl-2pyrrolidone, N-vinylpiperidone, N-vinyloxazolidone, dimethylaminostyrene, dialkylaminomethylstyrenes, quaternary salts of dialkylaminomethylstyrenes and (meth)acrylamide.

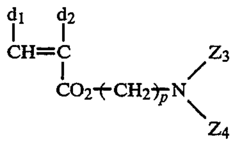

(IV)

In general formula (IV), $d_1$ and $d_2$ may be the same or different and each represents hydrogen atom or methyl group; $Z_3$ and $Z_4$ may be the same or different and each has the same meaning as $Z_1$ defined above; p represents an integer of 1 to 3.

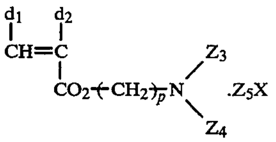

(V)

In general formula (V), $d_1$, $d_2$, p, $Z_3$ and $Z_4$ are as defined above in general formula (IV); $Z_5$ represents an alkyl group having 1 to 18 carbon atoms or an aralkyl group having 7 to 24 carbon atoms; and X represents halogen (e.g., fluorine, chlorine, bromine or iodine), acetate, $BF_4$, sulfate, p-toluenesulfonate or an alkylsulfonate.

The liquid developer of the present invention will be illustrated in more detail below.

The carrier solution used in the liquid developer of the present invention comprises a non-aqueous solvent having an electric resistance of at least $10^9$ Ωcm, preferably a non-aqueous solvent having an electric resistance of at least $10^9$ Ωcm and a dielectric constant of not higher than 3. The non-aqueous solvent comprises at least one member of solvents selected from the group consisting straight-chain or branched aliphatic hydrocarbons, alicyclic hydrocarbons, aromatic hydrocarbons and halogen-substituted compounds thereof. Specific examples of the non-aqueous solvent which can be used in the present invention include octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L (Isopar: trade name of Exxon Co.), Shellsol 70, Shellsol 71 (Shellsol: trade name of Shell Oil Co.), Amsco OMS and Amsco 460 (Amsco: trade name of Americal Mineral Spirits Co.). These solvents may be used either alone or as a mixture of two or more of them.

The non-aqueous dispersed resin particles (hereinafter often referred to as latex particles) which are the most important constituent component of the present invention are resin particles produced by copolymerizing a monomer component mainly composed of (a) at least one member of methyl methacrylate and ethyl methacrylate and (b) at least one member selected from the group consisting of acrylic esters and methacrylic esters having an alkyl group having not more than 4 carbon atoms in the presence of a dispersant composed of the above-described graft copolymer in a non-aqueous solvent to thereby conduct polymerization granulation.

Any of non-aqueous solvents can be basically used as the non-aqueous solvent used in the above polymerization of the present invention, so long as the non-aqueous solvents are miscible with the above-described carrier solutions used in the liquid developers for electrostatic photography.

Namely, any of solvents miscible with the carrier solutions can be used as the solvent used in the preparation of the dispersed resin particles. Preferred examples of such solvents include straight-chain or branched aliphatic hydrocarbons, alicyclic hydrocarbons, aromatic hydrocarbons and halogenated hydrocarbons thereof such as hexane, octane, isooctane, decane, isodecane, decalin, nonane, dodecane, isododecane, Isopar E, Isopar G, Isopar H, Isopar L, Shellsol 70, Shellsol 71, Amsco OMS and Amsco 460. These solvents may be used either alone or as a mixture of two or more of them.

These organic solvents may be used together with other solvents. Examples of such solvents which can be used together with the above-described non-aqueous solvents include alcohols (e.g., methyl alcohol, ethyl alcohol, propyl alcohol, butyl alcohol, fluorinated alcohols), ketones (e.g., acetone, methyl ethyl ketone, cyclohexanone), carboxylic acid esters (e.g., methyl acetate, ethyl acetate, propyl acetate, butyl acetate, methyl propionate, ethyl propionate), ethers (e.g., diethyl ether, dipropyl ether, tetrahydrofuran, dioxane) and halogenated hydrocarbons (e.g., methylene dichloride, chloroform, carbon tetrachloride, dichloroethane, methylchloroform).

It is preferred that these non-aqueous solvents which are used as a mixture with the aforesaid organic solvent are distilled off by heating or under reduced pressure after polymerization granulation. However, even when the solvents are brought into the liquid developers as a latex particle dispersion, the solvents cause no problem, so long as the liquid resistance of the developer is in the range of satisfying the condition of at least $10^9$ Ωcm.

Generally, it is preferred that the same solvent as the carrier solution is used in the step of preparing the resin dispersion, and such solvents include straight-chain or branched aliphatic hydrocarbons, alicyclic hydrocarbons, aromatic hydrocarbons and halogenated hydrocarbons thereof as described above.

The graft copolymer will be illustrated in more detail below.

The macromonomer (M) is a macromonomer having a weight-average molecular weight of $1\times10^3$ to $4\times10^4$ and such a structure that a polymerizable double bond-containing group of general formula (I) copolymerizable with the monomer of general formula (III) is bonded to one terminal of the main polymer chain comprising at least one member of repeating units of general formula (II).

In general formulas (I) and (II), each of the hydrocarbon groups in $a_1$, $a_2$, V, $b_1$, $b_2$, X0, $Q_0$ and Q has carbon atoms defined above (as the unsubstituted hydrocarbon group). These hydrocarbon groups may be substituted.

$Z_1$ in the substituent group represented by V in general formula (I) represents hydrogen atom or a hydrocarbon group. Preferred examples of the hydrocarbon group represented by $Z_1$ include an alkyl group having 1 to 22 carbon atoms which may be substituted (e.g., methyl, ethyl, propyl, butyl, heptyl, hexyl, octyl, decyl, dodecyl, tridecyl, tetradecyl, hexadecyl, octadecyl, 2-chloroethyl, 2-bromoethyl, 2-cyanoethyl, 2-methoxycarbonylethyl, 2-methoxyethyl, 2-bromopropyl), an alkenyl group having 4 to 18 carbon atoms which may be substituted (e.g., 2-methyl-l-propenyl, 2-butenyl, 2-pentenyl, 3-methyl-2-pentenyl, 1-pentenyl, 1-hexenyl, 2-hexenyl, 4-methyl-2-hexenyl), an aralkyl group having 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, dimethoxybenzyl), an alicyclic group having 5 to 8 carbon atoms which may be substituted (e.g., cyclohexyl, 2-cyclohexylethyl, 2-cyclopentylethyl), an aromatic group having 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, dodecyloylamidophenyl) and a group consisting of a crosslinking hydrocarbon having 5 to 18 carbon atoms (e.g., a group derived from bicyclo[1,1,0]-butane, bicyclo[3,2,1]octane, bicyclo[5,2,0]nonane, bicyclo-[4,3,2]undecane, adamantane or the like).

When V represents $-C_6H_4-$, the benzene ring may have one or more substituent groups. Examples of the substituent groups include halogen (e.g., chlorine or bromine) and an alkyl group (e.g., methyl, ethyl, propyl, butyl, chloromethyl, methoxymethyl).

$a_1$ and $a_2$ may be the same or different and each represents preferably hydrogen atom, a halogen atom (e.g., chlorine or bromine), cyano group, an alkyl group having 1 to 3 carbon atoms (e.g., methyl, ethyl, propyl), $-COO-Z_2$ or $-CH_2COOZ_2$ (wherein $Z_2$ is preferably hydrogen atom, an alkyl group having 1 to 18 carbon atoms, an alkenyl group, an aralkyl group, an alicyclic group or an aryl group, these groups may be substituted, and specific examples thereof include those already described above in the definition of $Z_1$), In general formula (II), $X_0$ represents at least one member selected from the group consisting of $-COO-$, $-OCO-$, $-(CH_2)_k-OCO-$, $-(CH_2)_k-COO-$, $-O-$, $-CONHCOO-$, $-CONHCO-$, $-SO_2-$, $-CO-$, $-CON(Z_1)-$, and $-SO_2N(Z_1)-$ or a bonding group composed of a combination of two or more of them; $Z_1$ represents hydrogen atom or a hydrocarbon group; $b_1$ and $b_2$ may be the same or different and each has the same meaning as $a_1$ and $a_2$ in general formula (I); and k represents an integer of 1 to 3.

$Q_0$ represents an aliphatic group having 4 to 22 carbon atoms; and $b_1$ and $b_2$ may be the same or different and each has the same meaning as $a_1$ and $a_2$ in general formula (I).

$Q_0$ represents an aliphatic group having 4 and 22 carbon atoms. Specific examples thereof include the alkyl group described above in the definition of $Z_1$.

Preferred examples of $Z_0$, $b_1$ and $b_2$ are the same as those set forth in the definition of preferred examples of V, $a_1$ and $a_2$.

More preferably, $a_1$ and $a_2$ in general formula (I) and $b_1$ and $b_2$ in general formula (II) are each hydrogen atom or methyl group.

The macromonomer (M) of the present invention has at least one member of repeating units represented by general formula (II). Preferred examples of repeating units of general formula (II) include, but are not limited to, the following units.

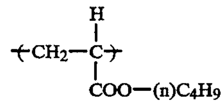
(A)-1

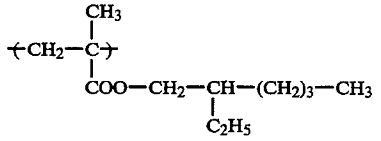
(A)-2

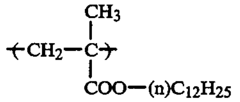
(A)-3

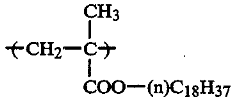
(A)-4

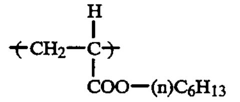
(A)-5

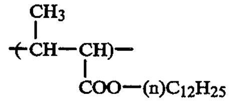
(A)-6

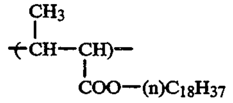
(A)-7

Among the macromonomers (M) of the present invention, compounds represented by the following general formula (VI) are preferred.

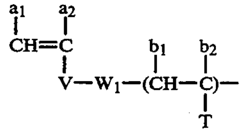
(VI)

In the above general formula, $a_1$, $a_2$, $b_1$, $b_2$ and V are as defined above in general formulas (I) and (II).

T represents $-X_0-Q_0$ in general formula (II), and $X_0$ and $Q_0$ are as defined above in general formula (II).

$W_1$ represents a single bond, a bonding group selected from the group consisting of the atomic groups of $-C(Z_6)(Z_7)-$ [wherein $Z_6$ and $Z_7$ each represents hydrogen atom, a halogen atom (e.g., fluorine, chlorine, bromine), cyano group or hydroxyl group], $-(CH=CH)-$, cyclohexylene group (the cyclohexylene group is hereinafter represented by Cy, and Cy includes 1,2-, 1,3- and 1,4-cyclohexylene groups), $-Ph-$, $-O-$, $-S-$, $-C(=O)-$, $-N(Z_8)-$, $-COO-$, $-SO_2-$, $-CON(Z_8)-$, $-SO_2N(Z_8)-$, $-NHCOO-$, $-NHCONH-$ and $-Si(Z_8)(Z_9)-$ (wherein $Z_8$ and $Z_9$ each represent hydrogen atom or a hydrocarbon group which has the same meaning as the hydrocarbon group represented by $Z_1$) or a bonding group composed of a combination of two or more of them.

Preferred examples of $X_0$, V, $a_1$, $a_2$, $b_1$ and $b_2$ in general formulas (I), (II) and (VI) are illustrated below.

Preferably, $X_0$ is a bonding group selected from the group consisting of $-COO-$, $-OCO-$, $-O-$, $-CH_2COO-$ and $-CH_2OCO-$ or a bonding group composed of a combination of two or more of them; V is a bonding group selected from the group consisting of the above-described bonding groups (wherein $Z_1$ is hydrogen atom); and $a_1$, $a_2$, $b_1$ and $b_2$ are each hydrogen atom or methyl group. Concrete examples of the group represented by $(a_1)CH=C(a_2)-V-W_1-$ in general formula (VI) include, but are not limited to, those described in Japanese Patent Application No. 1-253252 (corresponding to JP-A-3-188469 and U.S. application Ser. No. 07/589,577).

The macromonomers (M) of the present invention can be prepared by conventional synthesis methods. Examples of such synthesis methods include (1) an ionic polymerization method wherein various reagents are reacted with the terminals of living polymers obtained by anionic polymerization or cationic polymerization to form macromers, (2) a radical polymerization method wherein various reagents are reacted with oligomers having a reactive terminal group obtained by radical polymerization in the presence of a polymerization initiator having a reactive group such as carboxyl group, hydroxyl group or amino group per molecule and/or a chain transfer agent to form macromers, and (3) a polyaddition condensation method wherein a group having a polymerizable double bond is introduced into oligomers obtained by a polyaddition or polycondensation reaction in the same manner as in the above radical polymerization method.

More specifically, the macromonomers can be synthesized according to the methods described in P. Dreyfuss & R. P. Quirk, *Encycl. Polym. Sci. Eng.*, Vol. 7, page 551 (1987); P. F. Rempp & E. Franta, *Adv. Polym. Sci.*, Vol. 58, page 1 (1984); V. Percec, *Appl. Polym. Sci.*, Vol. 285, page 95 (1984); R. Asami, M. Takagi, *Makromol. Chem. Suppl.*, Vol. 12, page 163 (1985); P. Rempp. et al., *Makromol. Chem. Suppl.*, Vol. 8, page 3 (1987); Yushi Kawakami, *Kagaku Kogyo*, Vol. 38, page 56 (1987); Tatsuya Yamashita *Kobunshi*, Vol. 31, page 988 (1982); Shiro Kobayashi, *Kobunshi*, Vol. 30, page 625 (1981); Toshinobu Higashimura, *Nippon Setchaku Kyokaishi*, Vol. 18, page 536 (1982); Koichi Ito, *Kobunshi Kako*, Vol. 35, page 262 (1986); Shiro Toki, Takashi Tsuda, *Kino Zairyo*, 1987, No. 10, page 5; and the literature and patent specifications cited therein.

The monomer of general formula (III) which is a comonomer together with the macromonomer (M) for the preparation of the graft copolymer will be illustrated below.

In general formula (III), $X_1$ represents the same bonding group as $X_0$ in general formula (II) and is preferably —COO—, —OCO—, —$CH_2OCO$—, —$CH_2COO$—, —O—, or —Ph—; $Q_1$ represents hydrogen atom, an aliphatic group having 1 to 22 carbon atoms or an aromatic group having 6 to 12 carbon atoms, and examples of the aliphatic group and the aromatic group are the same as those represented by $Z_1$ in general formula (I); and $c_1$ and $c_2$ may be the same or different and each has the same meaning as $a_1$ and $a_2$ in general formula (I). Preferably, any one of $c_1$ and $c_2$ is hydrogen atom.

The graft copolymer may optionally have copolymerized units derived from other comonomers copolymerizable with the monomer of general formula (III). Examples of such comonomers which can be optionally used in the preparation of the graft copolymer include acrylonitrile, methacrylonitrile, acrylamide, methacrylamide, hydroxyethyl methacrylate, dialkylaminoethyl methacrylates (e.g., dimethylaminoethyl methacrylate), styrene, chlorostyrene, bromostyrene, vinylnaphthalene, heterocyclic compounds having a polymerizable double bond containing group (e.g., vinylpyridine, vinylimidazoline, vinylthiophene, vinyldioxane, vinylpyrrolidone), unsaturated carboxylic acids (e.g., acrylic acid, methacrylic acid, itaconic acid, crotonic acid, maleic acid), itaconic anhydride and maleic anhydride.

Any of comonomers copolymerizable with the monomer of general formula (III) can be used. However, it is preferred that the proportion of the comonomers in the graft copolymer is not more than 30% by weight based on the amount of the total copolymerized components.

Further, at least one polar group described below may be bonded to only one terminal of the main polymer chain of the graft copolymer of the present invention. Namely, at least one polar group selected from the group consisting of —$PO_3H_2$, —$SO_2H$, —COOH, —OH, —SH, —($Z_0$)P(O)OH (wherein $Z_0$ is —$Z_{10}$ or —$OZ_{10}$ and $Z_{10}$ is a hydrocarbon group), formyl group and an amino group may be bonded to only one terminal of the main polymer chain of the graft copolymer.

In the above-described polar group, $Z_{10}$ is preferably a hydrocarbon group having 1 to 18 carbon atoms. More preferably, the hydrocarbon group represented by $Z_{10}$ is an aliphatic group having 1 to 8 carbon atoms which may be substituted (e.g., methyl, ethyl, propyl, butyl, pentyl, hexyl, butenyl, pentenyl, hexenyl, 2-chloroethyl, 2-cyanoethyl, cyclopentyl, cyclohexyl, benzyl, phenethyl, chlorobenzyl, bromobenzyl) or an aromatic group which may be substituted (e.g., phenyl, tolyl, xylyl, mesityl, chlorophenyl, bromophenyl, methoxyphenyl, cyanophenyl).

In the polar group of the present invention, an amino group is —$NH_2$, —$NHZ_{11}$ or —$NHZ_{11}(Z_{12})$. $Z_{11}$ and $Z_{12}$ independently represent a hydrocarbon group having 1 to 18 carbon atoms, preferably a hydrocarbon group having 1 to 8 carbon atoms. Examples of the hydrocarbon group are the same as the hydrocarbon group represented by $Z_1$ described above.

More preferably, the hydrocarbon group represented by $Z_{10}$, $Z_{11}$ and $Z_{12}$ is an alkyl group having 1 to 4 carbon atoms which may be substituted, benzyl group which may be substituted or phenyl group which may be substituted.

The graft copolymer has such a chemical structure that the polar group is directly bonded to one terminal of the main polymer chain, or the polar group is bonded to one terminal of the main polymer chain through a bonding group. Examples of the bonding group through which the polar group is bonded to the graft copolymer component include carbon-to-carbon bonds (single bond, double bond), carbon-to-hetero-atom bond (examples of the hetero-atom includes oxygen atom, sulfur atom, nitrogen atom and silicon atom) and hetero-atom-to-hetero-atom bond.

Among the graft copolymers wherein the polar group specified above is bonded to one terminal of the main polymer chain according to the present invention, copolymers represented by the following general formula (VII*a*) or (VII*b*) are preferred.

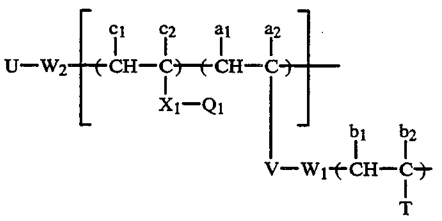

(VIIa)

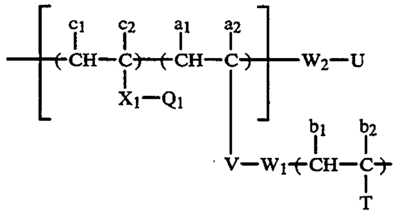

(VIIb)

In general formulas (VII*a*) and (VII*b*), $a_1$, $a_2$, $b_1$, $b_2$, $c_1$, $c_2$, $X_1$, $Q_1$, V, $W_1$ and T are the same as those set forth in general formulas (I) to (III).

U is a polar group to be bonded to one terminal of the graft copolymer.

$W_2$ is a single bond or a group through which the group U is bonded to the main polymer chain. Examples of $W_2$ are the same as $W_1$.

It is preferred that the graft copolymer has no copolymerized component having a polar group such as phosphono group, carboxyl group, sulfo group, hydroxyl group, formyl group, an amino group or a group of —$Z_0$P(O)OH in the main polymer chain when the graft copolymer has a specific polar group at the terminal of the main polymer chain as mentioned above.

The graft copolymer having a specific polar group at one terminal of the main polymer chain can be easily prepared, for example, by (1) a method (ionic polymerization method) wherein various reagents are reacted with one terminal of living polymers obtained by conventional anionic or cationic polymerization, (2) a method (radical polymerization method) wherein radical polymerization is carried out in the presence of a polymerization initiator having a specific polar group in the molecule and/or a chain transfer agent having a specific polar group in the molecule, or (3) a method wherein the reactive terminal group of a polymer obtained by the ionic polymerization or the radical polymerization mentioned above is converted into a specific polar group of the present invention by a high-molecular reaction.

More specifically, the graft copolymer can be prepared according to the methods described in P. Dreyfuss & R. P. Quirk, *Encycl. Polym. Sci. Eng.*, Vol. 7, page 551 (1987), Yoshiki Nakajo & Yuya Yamashita, *Senryo and Yakuhin*, Vol. 30, page 232 (1985), Akira Ueda &

Susumu Nagai, *Kagaku and Kogyo*, Vol. 60, page 57 (1986), and the literature cited therein.

Examples of the polymerization initiator having a specific polar group in the molecule include azobis compounds such as 4,4'-azobis(4-cyanovaleric acid), 4,4'-azobis(4-cyanovaleryl chloride), 2,2'-azobis(2-cyanopropanol), 2,2'-azobis (2-cyanopentanol), 2,2'-azobis[2-methyl-N-(2-hydroxyethyl)propioamide], 2,2'-azobis{2-methyl-N-[1,1-bis(hydroxymethyl)ethylpropioamide}, 2,2'-azobis{2-methyl-N-[1,1-bis(hydroxymethyl)-2-hydroxyethyl ]propioamide},2,2'-azobis[2-(5-methyl-2-imidazole-2-yl )propane], 2,2'-azobis[2-(4,5,6,7-tetrahydro-1H-1,3-diazepine-2-yl)propane], 2,2'-azobis[2-(3,4,5,6-tetrahydropyrimidine-2-yl)propane], 2,2'-azobis [2-(5-hydroxy-3,4,5,6-tetrapyrimidine-2-yl )propane], 2,2'-azobis{2-[1-(2-hydroxyethyl)-2-imidazoline-2-yl]propane}, 2,2'-azobis[N-(2-hydroxyethyl)-2-methyl-propioneamidine] and 2,2'-azobis[N-(4-aminophenyl)-2-methylpropionamidine].

Examples of the chain transfer agent having a specific polar group in the molecule include mercapto compounds having a polar group or a substituent group capable of being converted into a polar group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)-carbamoyl]propionic acid, 3-[N-(2-mercaptoethyl-)amino]propionic acid, N-(3-mercaptopropionyl)alanine, 2-mercaptoethanesulfonic acid, 3-mercaptosulfonic acid, 2-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, 2-mercapto-3-pyridinol) and alkyl iodide compounds having a specific polar group or a substituent group capable of being converted into a polar group (e.g., iodoacetic acid, iodopropionic acid, 2-iodoethanol, 2-iodoethanesulfonic acid, 3-iodopropanesulfonic acid). The mercapto compounds are preferred.

These chain transfer agents or polymerization initiators are used in an amount of 0.1 to 10 parts by weight, preferably 0.5 to 5 parts by weight based on 100 parts by weight of the total amount of the monomers.

The compounds represented by general formula (VII*a*) or (VII*b*) are preferred as the graft copolymers wherein the polar group is bonded to one terminal of the main polymer chain of the graft copolymer of the present invention. Examples of the moiety represented by U—$W_2$— in these general formulas include those described in Japanese Patent Application No. 1-253252 (corresponding to JP-A-3-188469 and U.S. application Ser. No. 07/589,577).

The dispersed resin particles are obtained by polymerizing a monomer mixture of methyl methacrylate and at least one member of acrylic esters and methacrylic esters having an alkyl group having not more than 4 carbon atoms in the presence of a dispersion stabilizing resin in a solvent. Any of the resin particles prepared by using these monomers can be used as the desired dispersed resin particles, so long as the resulting resin particles are insoluble in the nonaqueous solvent.

Preferred examples of the monomer mixture used in the production of the dispersed resin particles include methyl methacrylate and methyl acrytate; methyl methacrylate and ethyl acrylate; methyl methacrylate and propyl acrylate; methyl methacrylate and butyl acrylate; methyl methacrylate and butyl methacrylate; and ethyl methacrylate and methyl acrylate.

In the preparation of the dispersed resin particles, other monomer (c) copolymerizable with the above monomers may be used.

Examples of the monomer (c) include vinyl monomers having basic nitrogen atom or an amido group.

Specific examples of the monomer (c) include vinyl monomers such as aminoalkyl-substituted (meth)acrylates represented by the following general formula (IV), quaternary-salts of aminoalkyl-substituted (meth)acrylates represented by the following general formula (V), N-vinylimidazole, N-vinyl-2-methylimidazole, 1-vinylpyrrole, N-β-acryloxyethylindole, 2-vinylquinoline, 4-vinylpyridine, 5-vinyl-4-methylthiazole, 3-methyl-5-isopropenylpyrazole, N-vinyl-2-pyrrolidone, N-vinylpiperidone, N-vinyloxazolidone, dimethylaminostyrene, dialkylaminomethylstyrenes, quaternary salts of dialkylaminostyrenes and (meth)acrylamide.

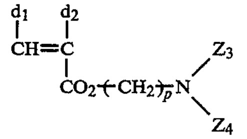

(IV)

In general formula (IV), $d_1$ and $d_2$ may be the same or different and each represents hydrogen atom or methyl group; $Z_3$ and $Z_4$ may be the same or different and each has the same meaning as $Z_1$, and p represents an integer of 1 to 3.

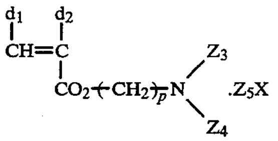

(V)

In general formula (V), $d_1$, $d_2$, p, $Z_3$ and $Z_4$ are the same as those set forth in general formula (IV); $Z_5$ represents an alkyl group having 1 to 18 carbon atoms or an aralkyl group having 7 to 24 carbon atoms; and X represents halogen (fluorine, chlorine, bromine or iodine), acetate, $BF_4$, sulfate, p-toluenesulfonate or an alkylsulfonate.

The acrylic esters or methacrylic esters having an alkyl group having not more than 4 carbon atoms are present in the resin particles in an amount of 0.1 to 9 mol per mol of methyl methacrylate and/or ethyl methacrylate.

The content of the monomer component (c) copolymerizable with the monomer components (a) and (b) is not more than 30 mol % based on the total amount of the monomers.

The dispersed resin particles used in the present invention have a molecular weight of $10^3$ to $10^6$.

The dispersed resin particles (latex particles) used in the present invention can be prepared by polymerizing the (meth)acrylic ester monomers in the presence of the above-described dispersion stabilizing resin and a polymerization initiator such as benzoyl peroxide, azobis(2,4-dimethylvaleronitrile), azobis(4-methoxy-2,4-dimethylvaleronitrile), azobisisobutyronitrile or butyllithium in a non-aqueous solvent with heating.

More specifically, the dispersed resin particles can be prepared by any of (1) a method wherein a polymerization initiator is added to a mixed solution containing the dispersion stabilizing resin, the monomer (a), the monomer (b) and optionally the monomer (c); (2) a method wherein the monomer (a), the monomer (b) and optionally the monomer (c) together with the polymerization initiator are added dropwise to a solution containing the dispersion stabilizing resin dissolved therein; (3) a method wherein the whole of the dispersion stabilizing resin and a part of a mixture of the monomer (a), the monomer (b) and optionally the monomer (c) are dissolved in a solvent, and the remainder of the monomer mixture together with the polymerization initiator is added to the above mixed solution; and (4) a method wherein a mixed solution containing the dispersion stabilizing resin and the monomer mixture together with the polymerization initiator is added to the non-aqueous solution.

The total amount of the (meth)acrylic esters is to 80 parts by weight, preferably 5 to 50 parts by weight based on 100 parts by weight of the non-aqueous solvent.

The soluble resin which is a dispersion stabilizer is used in an amount of 1 to 100 parts by weight, preferably 3 to 50 parts by weight based on 100 parts by weight of the entire monomers.

The amount of the polymerization initiator is preferably 0.1 to 5 mol % based on the amount of the entire monomers. The polymerization temperature is 20 to 180° C., preferably 30° to 120° C. The reaction time is preferably 1 to 15 hours.

It is preferred that when the above-described polar solvents such as the above-described alcohols, ketones, ethers or esters together with the non-aqueous solvent are used for the reaction or when the unreacted materials of the monomer (a), the monomer (b) and optionally the monomer (c) to be polymerization-granulated are left behind, the reaction mixture is heated at a temperature of not lower than the boiling point of the solvents or the monomers to distill them off, or the solvents or the monomers are distilled off under reduced pressure.

The thus-prepared non-aqueous latex particles are very fine particles having a uniform particle size distribution and exhibit very stable dispersibility. Particularly, even when the liquid developer is repeatedly used in a developing apparatus over a long period of time, the particles retain good dispersibility, and even when development speed is increased, the particles can be readily redispersed and any staining caused by the adhesion thereof to the various parts of the apparatus is not observed at all.

Further, when fixing is conducted by heating, a firm film is formed and the particles exhibit excellent fixability.

Furthermore, the liquid developer of the present invention enables the development-fixing stage to be expedited. Even when the intervals of maintenance are prolonged, the liquid developer of the present invention is excellent in dispersion stability, redispersibility and fixability.

If desired, the liquid developer of the present invention may contain coloring agents. Any of conventional pigments or dyes can be used as the coloring agents in the present invention without particular limitation.

When the dispersed resin itself is to be colored, an example of the coloring method includes a method wherein a pigment or a dye is physically dispersed in the dispersed resin. Many pigments and dyes which can be used are known. Examples thereof include magnetic iron oxide powder, lead iodide powder, carbon black, nigrosine, Alkali Blue, Hansa Yellow, Quinacridone Red and Phthalocyanine Blue.

Another coloring method is a method wherein the dispersed resin is dyed with a preferred dye as described in JP-A-57-48738. Still another coloring method is a method wherein the dispersed resin is chemically bonded to a dye as described in JP-A-53-54028. Other method is such that when the dispersed resin is prepared by the polymerization granulation method, monomers containing previously a dye are used to prepare a dye-containing copolymer as described in JP-B-44-22955.

If desired, various charge controlling agents may be added to the liquid developer of the present invention to enhance charging characteristics or to improve image characteristics.

Any of conventional charge controlling agents for liquid developers can be used in the present invention. Examples of the charge controlling agents include metal salts of fatty acids such as naphthenic acid, octenic acid, oleic acid and stearic acid and metal salts of sulfosuccinates; metal salts of oilsoluble sulfonic acids described in JP-B-45-556, JP-A-52-37435 and JP-A-52-37049; metal salts of phosphoric acid esters described in JP-B-45-9594; abietic acids and metals of hydrogenated abietic acids described in JP-B-48-25666; calcium salts of alkylbenzenesulfonic acids described in JP-B-55-2620; metal salts of aromatic carboxylic acids or sulfonic aids, nonionic surfactants such as polyoxyethylated alkylamines, fats and oils such as lecithin and linseed oil, polyvinyl pyrrolidone, esters of organic acids with polyhydric alcohols described in JP-A-52-107837, JP-A-52-38937, JP-A-57-90643 and JP-A-57-139753; phosphoric ester surfactants described in JP-A-57-210354; and sulfonic acid resins described in JP-B-56-24944. Other examples of the charge controlling agents which can be used include amino acid derivatives described in JP-A-60-21056 and JP-A-61-50951; copolymers containing a maleic acid half amide component described in JP-A-60-173558 and JP-A-60-179750; and quaternized amine polymers described in JP-A-54-31739 and JP-B-56-24944.

Among them, preferred are metal salts of naphthenic acid, metal salts of dioctyl sulfosuccinate, the copolymers containing a maleic acid half amide component, lecithin and the amino acid derivatives.

These charge controlling agents may be used in combination of two or more of the above compounds. The charge controlling agents are used in an amount of preferably 0.001 to 1.0 part by weight based on 1,000 parts by weight of the carrier solution. If desired, various additives may be added. The upper limit of the total amount of the additives is set by the electric resistance of the developer. Namely, when the liquid developer from which the toner particles are removed has an electric resistance of less than $10^9$ ohm·cm, it is difficult to obtain a continuous tone image of good quality, and hence the amounts of the additives should be controlled so as to conform to this limit.

Various supports can be used as electrically conductive substrates for the original plates for printing in electrophotographic processes in the present invention. Examples of the supports which can be used as the electrically conductive substrates in the present invention include electrically conductive substrates having a hydrophilic surface such as plastic sheets having an electrically conductive surface, paper which is made solvent-impermeable in particular and electrical conductive, aluminum sheets, zinc sheets, bimetal sheets, e.g., copper-aluminum sheets, copper-stainless steel sheets and chromium-copper sheets and trimetal sheets, e.g., chromium-copper-aluminum sheets, chromium-lead-iron sheets and chromium-copper-stainless steel sheets. The substrates have a thickness of preferably 0.1 to 3 mm, particularly preferably 0.1 to 0.5 mm. Among these substrates, aluminum sheets are preferable.

The aluminum sheets which can be used for the original plates for printing in electrophotographic processes in the present invention are sheet materials such as pure aluminum sheet and aluminum-based alloys comprising aluminum as the principal ingredient and a very small amount of one or more of other elements. Any of conventional materials can be used without particular limitation with regard to the compositions thereof.

The aluminum sheets are grained and anodized in a conventional manner and then used. If desired, the surfaces of the aluminum sheets may be degreased with surfactants or aqueous alkaline solutions prior to the graining treatment to remove grease deposited on the surfaces of the aluminum sheets. The degreased aluminum sheets are then grained. Graining methods include a method wherein the surface of the aluminum sheet is mechanically roughened, a method wherein the surface thereof is electrochemically dissolved and a method wherein the surface thereof is chemically selectivedissolved. The method wherein the surface of the aluminum sheet is mechanically roughened includes conventional methods such as ball-polishing method, brushing method, blasting method and buffing method. An example of the method wherein the surface of the aluminum sheet is electrochemically roughened includes a method wherein the roughening of the surface is carried out in a hydrochloric acid or nitric acid electrolytic solution by an alternating current or direct current. A combination of the above two methods can be used as described in JP-A-54-63902.

If desired, the roughened aluminum sheet may be treated with an alkaline etching solution and neutralized. The thus-treated aluminum sheet is then anodized. Examples of electrolytes which can be used in the anodizing of the aluminum sheet include sulfuric acid, phosphoric acid, oxalic acid, chromic acid and a mixture thereof. The electrolyte to be used and the concentration thereof can be properly determined according to the types of the electrolytes. Anodizing conditions vary depending on the types of the electrolytes to be used, but are generally such that the concentration of the electrolyte is a 1 to 80 wt % solution, the temperature of the electrolytic solution is 5° to 7° C., the current density is 5 to 60 $A/dm^2$, voltage is 1 to 100 V and the electrolytic time is in the range of 10 seconds to 50 minutes. The anodized film is preferably 0.1 to 10 $g/m^2$, more preferably 1 to 6 $g/m^2$. The aluminum sheet has a thickness of preferably 0.1 to 3 mm, particularly preferably 0.1 to 0.5 mm.

Further, it is preferred that after the aluminum sheet is anodized, the sheet is immersed in an aqueous solution of an alkali metal silicate as described in JP-B-47-5125. Furthermore, silicate electrodeposition as described in U.S. Pat. No. 3,658,662 is effective. A treatment with polyvinylsulfonic acids as described in West German Patent 1,621,478 is also effective.

Any of many compounds conventionally known can be used as organic photoconductive compounds in the present invention. Examples of such compounds which can be used as the organic photoconductive compounds in the present invention include triazole derivatives, oxadiazole derivatives, imidazole derivatives, polyarylalkane derivatives, pyrazoline derivatives, pyrazolone derivatives, phenylenediamine derivatives, arylamine derivatives, amino-substituted chalcone derivatives, N,N-bicarbazyl derivatives, oxazole derivatives, styrylanthracene derivatives, fluorenone derivatives, hydrazine derivatives, benzidine derivatives and stilbene derivatives.

In addition to the above-described low-molecular photoconductive compounds, high-molecular compounds can be used. Examples of the high-molecular compounds include vinyl polymers such as polyvinyl carbazole and derivatives thereof, polyvinyl pyrene, polyvinyl anthracene, poly-2-vinyl-4-(4'-dimethylaminophenyl)-5-phenyloxazole and poly-3-vinyl-N-ethylcarbazole; polymers such as polyacenaphthylene, polyindene and copolymers of acenaphthylene with styrene; and condensation resins such as pyrene-formaldehyde resins, bromopyrene-formaldehyde resins and ethylcarbazole-formaldehyde resins.

Further, various pigments can be used as the organic photoconductive compounds. Examples of the pigments include monoazo, bisazo and tris-azo pigments, phthalocyanine pigments such as metal phthalocyanine pigments and metal-free phthalocyanine pigments, perylene pigments, indigo, thioindigo derivatives, quinacridone pigments, polycyclic quinone pigments, bisbenzimidazole pigments, squarylium salt pigments and azulenium salt pigments.

These organic photoconductive compounds may be used either alone or in a combination of two or more of them.

The photoconductive layer of the present invention may contain sensitizing agents such as sensitizing dyes for the purpose of improving sensitivity, and the like. Examples of the sensitizing dyes which can be used in the present invention include conventional compounds described in *Sensitizing Agent*, page 125 (published by Kodansha 1987), *Electrophotography*, Vol. 12, page 9 (1973) and *Organic Synthesis Chemistry*, Vol. 24, No. 11, page 1010 (1966). Specific examples of the sensitizing dyes include pyrylium dyes, triarylmethane dyes, cyanine dyes and styryl dyes.

Other examples of the sensitizing agents which can be used in addition to the sensitizing dyes include electron attractive compounds such as trinitrofluorenone, chloranil and tetracyanoethylene.

Any of binder resins can be used in the original plate for printing for use in the making of a plate for electrophotography without particular limitation, so long as the non-image areas can be removed by the etching solutions after toner development. Examples of the binder resins include copolymers of a (meth)acrylate, styrene or vinyl acetate with a monomer having carboxyl group or acid anhydride group such as (meth)acrylic acid, itaconic acid, crotonic acid, maleic acid, maleic anhydride, a monoalkyl maleate and fumaric acid (for example, styrene/maleic anhydride copolymers, styrene/monoalkyl maleate copolymers, (meth)acrylic acid/(meth)acrylate copolymers, styrene/(meth)acrylic acid/(meth)acrylate copolymers, vinyl acetate/crotonic acid copolymers, vinyl acetate/crotonic acid/(meth)acrylate copolymers, and vinyl acetate/vinyl ester of $C_2$ to $C_{18}$ carboxylic acid/crotonic acid copolymers); copolymers of (meth)acrylamide or vinylpyrrolidone with a monomer having phenolic hydroxyl group, sulfo group, sulfonamido group or sulfonimido group; novolak resins obtained by condensating phenol, o-cresol, m-cresol or p-cresol with formaldehyde or acetaldehyde; partially saponified vinyl acetate resins; polyvinyl acetal resins such as polyvinyl butyral; and urethane resins having carboxyl group.

Among these binder resins, the copolymers of a (meth)acrylate, styrene or vinyl acetate with a monomer having carboxyl group such as (meth)acrylic acid, the copolymers of a (meth)acrylate, styrene or vinyl acetate, and a monomer having carboxyl group such as (meth)acrylic acid with another monomer are preferred from the viewpoints of electrophotography, etching and printability.

More preferred are the copolymers of (meth)acrylic acid with an ester derived from (meth)acrylic acid and an aliphatic or aromatic alcohol such as methyl alcohol, ethyl alcohol, propyl alcohol, isopropyl alcohol, butyl alcohol, isobutyl alcohol, sec-butyl alcohol, tert-butyl alcohol, n-amyl alcohol, isoamyl alcohol, hexyl alcohol, octyl alcohol, benzyl alcohol or phenethyl alcohol.

The original plate for printing for use in the making of a plate for electrophotography according to the present invention can be obtained by coating a photoconductive layer on the aluminum sheet substrate in a conventional manner. Examples of conventional methods for preparing the photoconductive layer include a method wherein ingredients which constitute the photoconductive layer are contained in the same layer and a method wherein a charge carrier forming material and a charge carrier transporting material are separately contained in different layers. Any of these methods can be used in the present invention to prepare the photoconductive layer. A coating solution for forming the photoconductive layer can be prepared by dissolving ingredients constituting the layer in an appropriate solvent. When solvent-insoluble ingredients such as a pigment, etc. are used, the ingredients are finely divided into a powder having a particle size of not larger than 5 μ and dispersed by using a dispersion device such as a ball mill, a paint shaker, a dyno mill or an attritor. The binder resin and other additives which are used in the photoconductive layer can be added to the coating solution during or after the dispersion of the pigment, etc. The thus-prepared coating solution is coated on the substrate by a conventional method such as rotary coating, blade coating, knife coating, reverse roll coating, dip coating, rod bar coating or spray coating, and the coated substrate is dried to obtain the original plate for printing for use in the making of a plate for electrophotography.

Examples of the solvent which can be used to prepare the coating solution include halogenated hydrocarbons such as dichloromethane, dichloroethane and chloroform; alcohols such as methanol and ethanol; ketones such as acetone, methyl ethyl ketone and cyclohexanone; glycol ethers such as ethylene glycol monomethyl ether and 2-methoxyethyl acetate; ethers such as tetrahydrofuran and dioxane; and esters such as ethyl acetate and butyl acetate.

Various additives such as plasticizers, surfactants, matting agents, etc. in addition to the photoconductive compound and the binder resin may be optionally added to the photoconductive layer of the present invention to improve the flexibility and coated surface profile of the photoconductive layer. These additives may be used in such an amount that the electrostatic characteristics and etchability of the photoconductive layer are not deteriorated by them.

With regard to the thickness of the photoconductive layer, the layer can not be charged at a surface potential required for development when the thickness is too thin, while when the thickness is too thick, side etching is liable to be caused and a good printing plate can not be obtained. The thickness of the photoconductive layer is generally 0.1 to 30 μ, preferably 0.5 to 10 μ.

With regard to the contents of the binder resin and the photoconductive compound in the photoconductive layer of the present invention, sensitivity is lowered when the content of the photoconductive compound is low. Accordingly, the-photoconductive compound is used in an amount of preferably 0.05 to 1.2 parts by weight, more preferably 0.1 to 1.0 part by weight per one part by weight of the binder resin.

Any of solvents can be used as the etching solutions for removing the photoconductive insulating layer of the non-image areas after the formation of the toner image, so long as the photoconductive insulating layer can be removed. Though there is no particular limitation with regard to the solvents to be used, alkaline solvents can be preferably used. The term "alkaline solvent" as used herein refers to an aqueous solution containing an alkaline compound, an organic solvent containing an alkaline compound or a mixture of an aqueous solution containing an alkaline compound and an organic solvent containing an alkaline compound.

Examples of the alkaline compound include organic and inorganic alkaline compounds such as sodium hydroxide, potassium hydroxide, sodium carbonate, sodium silicate, potassium silicate, lithium silicate, sodium metasilicate, potassium metasilicate, sodium phosphate, potassium phosphate, ammonia, monoethanolamine, diethanolamine, triethanolamine, monoisopropanolamine, triisopropanolamine, diethylaminoethanol and 2-amino-2-methylpropanol.

Among them, a silicate represented by the general formula of m $SiO_2$/n $M_2O$ (wherein M: an alkali metal, m/n=0.5 to 8.5) is preferred. When the silicate is contained in the etching solution, better etching property and printing characteristics can be obtained. The molar ratio m/n of m $SiO_2$/n $M_2O$ used in the present invention is preferably 0.5 to 8.5.

If desired, various organic solvents can be optionally added to the etching solution mainly composed of water. Preferred examples of the organic solvents include lower alcohols and aromatic alcohols such as methanol, ethanol, propanol, butanol, benzyl alcohol and phenethyl alcohol; polyhydric alcohols such as ethylene glycol, diethylene glycol, triethylene glycol and polyethylene glycol; ether alcohols; ether esters; ethers; ketones; and esters. Further, surfactants, anti-foaming agents and other additives may be optionally contained in the etching solutions.

The present invention is illustrated in greater detail by reference to the preparation examples of dispersion stabilizing resins and latex particles and the following examples. It should be understood, however, that the scope of the present invention is not limited thereto. The macromonomers used in the preparation of the dispersion stabilizing resins can be easily prepared according to the method described in Japanese Patent Application No. 1-253252 (corresponding to JP-A-3-188649 and U.S. application Ser. No. 07/589,577).

The term "copolymer resin particles" described above is hereinafter not used, and the term "latex particles" is hereinafter used instead, in order to maintain a clear distinction between the copolymer resin and the dispersion stabilizing resin.

Typical examples and preparation examples are illustrated below.

Macromonomer Preparation Example 1 (M-1)

A mixed solution of 100 g of octadecyl methacrylate, 1 g of thioglycolic acid and 200 g of toluene was heated to 75° C. with stirring in a nitrogen gas stream. Subsequently, 1.5 g of azobisisobutyronitrile (A.I.B.N.) was added thereto, and the mixture was reacted for one hour. Further, 0.5 g of A.I.B.N. was added thereto, and the reaction was carried out for 3 hours. Thereafter, 0.3 g of A.I.B.N. was further added thereto, and the reaction was carried out for 3 hours. The resulting reaction mixture (solution) was cooled to room temperature, and 2.8 g of 2-hydroxyethyl methacrylate was added thereto. A mixed solution of 4.5 g of dicyclohexylcarbodiimide (abbreviated to D.C.C.) and 10 g of methylene chloride was added dropwise thereto over a period of one hour. Subsequently, 0.1 g of 4-dimethylaminopyridine and 0.1 g of t-butylhydroquinone were added thereto, and the mixture as such was stirred for 4 hours.

The precipitated crystal was recovered by filtration. The filtrate was again precipitated in 2 l of methanol. The precipitated white solid was collected by decantation, dissolved in 300 ml of tetrahydrofuran and reprecipitated in 3 l of methanol. The precipitated white powder was collected and dried under reduced pressure to obtain a polymer having a number-average molecular weight of 6,100. Yield: 93.2 g. The molecular weight in terms of polystyrene was measured by GPC.

Macromonomer(M-1)

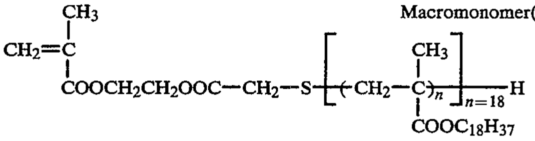

Macromonomer Preparation Examples 2 to 9 (M-2 to M-9)

Each of macromonomers indicated in Tables 1 to 4 was prepared in the same manner as in Preparation Example of the macromonomer M-1 except that a methacrylate monomer, chain transfer agent, an initiator and an unsaturated carboxylic acid ester were used in place of dodecyl methacrylate, thioglycolic acid, A.I.B.N. and 2-carboxyethyl methacrylate used in Preparation Example of the macromonomer M-1. The resulting macromonomers had a weight-average molecular weight of 3,000 to 15,000.

TABLE 1

| Macromonomer Preparation Example | Macromonomer | Chemical Structure of Macromonomer | |
|---|---|---|---|
| 2 | M-2 | 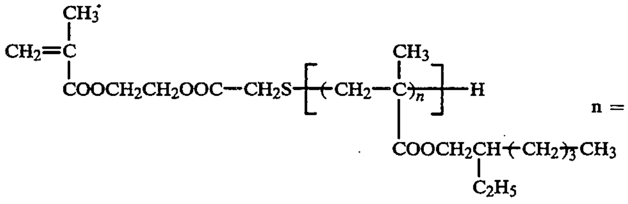 | n = 3 to 300 |
| 3 | M-3 | 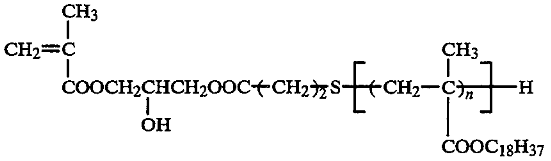 | n = 3 to 300 |

TABLE 2

| Macromonomer Preparation Example | Macromonomer | Chemical Structure of Macromonomer | |
|---|---|---|---|
| 4 | M-4 | 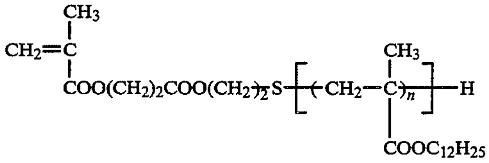 | n = 3 to 300 |
| 5 | M-5 | 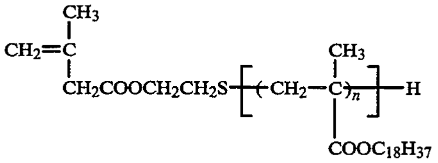 | n = 3 to 300 |

TABLE 3

| Macromonomer Preparation Example | Macromonomer | Chemical Structure of Macromonomer | |
|---|---|---|---|
| 6 | M-6 | 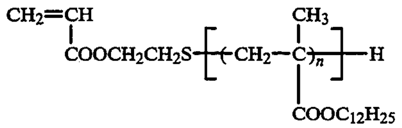 | n = 3 to 300 |
| 7 | M-7 | 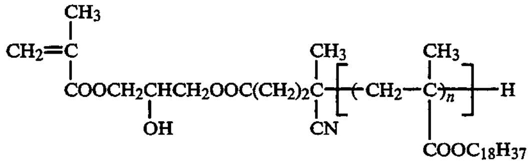 | n = 3 to 300 |

TABLE 4

| Macromonomer Preparation Example | Macromonomer | Chemical Structure of Macromonomer | |
|---|---|---|---|
| 8 | M-8 | 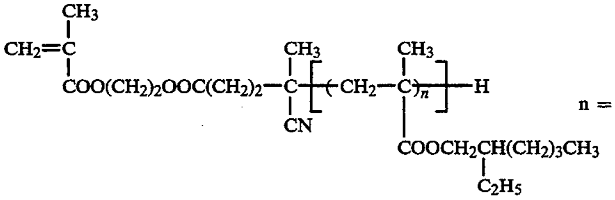 | n = 3 to 300 |
| 9 | M-9 | 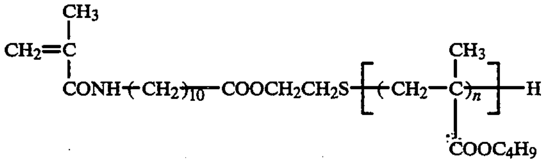 | n = 3 to 300 |

Dispersion Stabilizing Resin Preparation Example 1 (P-1)

A mixed solution of 50 g of styrene, 50 g of the macromonomer M-1 and 200 g of toluene was placed in a four-necked flask and heated to 80° C. with stirring in a nitrogen gas stream.

Subsequently, 1 g of 1,1'-azobis(1-cyclohexanecarbonitrile) as a polymerization initiator was added thereto, and a polymerization reaction was carried out at 80° C. for 24 hours. After the polymerization reaction, the reaction mixture was cooled to room temperature, and 200 g of toluene was further added thereto. The mixture was again precipitated in 4 l of methanol. After filtration, the resulting white powder was dried to obtain 92 g of a powder having a weight average molecular weight of $4.3\times10^4$.

Dispersion stabilizing resin P-1

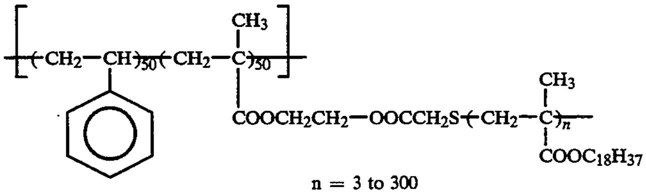

n = 3 to 300

Dispersion Stabilizing Resin Preparation Examples 2 to 13 (P-2 to P-13)

Each of dispersion stabilizing resins P-2 to P-13 was prepared in the same manner as in Preparation Example 1 of P-1 except that styrene monomer and each macromonomer indicated in Table 5 were used in place of the monomers used in Preparation Example 1. The resulting resins had a weight-average molecular weight of $3.0\times10^4$ to $9.0\times10^4$.

TABLE 5

| Resin Preparation Example | Dispersion stabilizing resin | Monomer (corres. to styrene) | Macro-monomer | Monomer/Macromonomer (wt/wt) |
|---|---|---|---|---|
| 2 | P-2 | styrene | M-1 | 30/70 |
| 3 | P-3 | styrene | M-1 | 70/30 |
| 4 | P-4 | styrene | M-2 | 30/70 |
| 5 | P-5 | styrene | M-2 | 50/50 |
| 6 | P-6 | styrene | M-3 | 50/50 |

TABLE 5-continued

| Resin Preparation Example | Dispersion stabilizing resin | Monomer (corres. to styrene) | Macro-monomer | Monomer/Macromonomer (wt/wt) |
|---|---|---|---|---|
| 7 | P-7 | styrene | M-4 | 30/70 |
| 8 | P-8 | styrene | M-6 | 50/50 |
| 9 | P-9 | styrene | M-8 | 10/90 |
| 10 | P-10 | MMA | M-1 | 30/70 |
| 11 | P-11 | MMA | M-1 | 10/90 |
| 12 | P-12 | MMA | M-2 | 20/80 |
| 13 | P-13 | MMA | M-7 | 30/70 |

Comparative Dispersion Stabilizing Resin Example 1 (R-1)

In the same manner as in Dispersion Stabilizing Resin Preparation Example 1, 30 g of styrene, 70 g of stearyl methacrylate and 200 g of toluene were placed in a four-necked flask, and the flask was purged with nitrogen gas. After the mixture was heated at 80° C. for one hour, 1 g of 1,1'-azobis(1-cyclohexanecarbonitrile) was added thereto, and a polymerization reaction was carried out at 80° C. for 24 hours. In the same manner as in Preparation Example 1, re-precipitation was conducted in methanol to obtain a polymer. The resulting polymer was a random copolymer and had a weight-average molecular weight of $5.7\times10^4$.

Comparative Preparation Example 2 (R-2)

A random copolymer was prepared in the same manner as in Comparative Preparation Example 1 except that lauryl methacrylate was used in place of stearyl methacrylate. The random polymer had a weight-average molecular weight of $6.3\times10^4$.

Comparative Preparation Example 3 (R-3)

A random copolymer was prepared in the same manner as in Comparative Preparation Example 1 except that 10 g of methyl methacrylate and 90 g of stearyl methacrylate were used in place of styrene. The random copolymer had a weight-average molecular weight of $6.0\times10^4$.

Latex Particle Preparation Example 1 (D-1)

A mixed solution of 20 g of the dispersion stabilizing resin P-1, 53.8 g of methyl methacrylate, 46.2 g of methyl acrylate and 400 g of Isopar H was heated to 70° C. with stirring in a nitrogen gas stream. Subsequently, 6.6 g of 2,2'-azobis(2,4-dimethylvaleronitrile) was added thereto, and the mixture was reacted for 6 hours. After 10 minutes from the addition of the initiator, the mixture became cloudy and the reaction temperature was temporarily raised to 93° C. and again lowered to 70° C. After 6 hours, the temperature was raised to 90° C., the mixture was stirred for 2 hours and unreacted monomers were distilled off. After cooling, a white dispersion passed through 200-mesh nylon cloth was a latex having an average particle size of 0.30 μm at monomer conversion ratio of 94%. After the white dispersion was left to stand for one month, the dispersion state thereof was good.

Latex Particle Preparation Examples 2 to 9 (D-2 to D-9)

Latex particles were prepared in the same manner as in Latex Particle Preparation Example 1 except that each dispersion stabilizing resin indicated in Table 6 was used in place of the dispersion stabilizing resin P-1 used in Preparation Example 1. The results are shown in Table 6. The convention ratios of the monomers to the particles were 85 to 95%.

TABLE 6

| Latex Preparation Example | Latex Particles | Dispersion Stabilizing Resin | Average Particle Size of Latex (μm) | Dispersion State* |
|---|---|---|---|---|
| 2 | D-2 | P-3 | 0.33 | good |
| 3 | D-3 | P-5 | 0.28 | " |
| 4 | D-4 | P-6 | 0.28 | " |
| 5 | D-5 | P-8 | 0.35 | " |
| 6 | D-6 | P-10 | 0.10 | " |
| 7 | D-7 | P-11 | 0.34 | " |
| 8 | D-8 | P-12 | 0.11 | " |
| 9 | D-9 | P-13 | 0.19 | " |

*Dispersion state after left to stand for one month for storage.

Comparative Latex Particle Preparation Examples 1 to 3 (S-1 to S-3)

Latex particles were prepared in the same manner as in Latex Particle Preparation Example 1 except that each of the dispersion stabilizing resins R-1, R-2 and R-3 was used in place of the dispersion stabilizing resin P-1 used in Preparation Example 1. The results are shown in Table 7. The conversion ratios of the monomers to the particles were 90 to 95%.

TABLE 7

| Comparative Latex Preparation Example | Latex Particles | Comparative Dispersion Stabilizing Resin | Average Particle Size of Latex (μ) | Dispersion State* |
|---|---|---|---|---|
| Comp. Ex. 1 | S-1 | R-1 | 3.2 | large amounts of precipitates |
| Comp. Ex. 2 | S-2 | R-2 | 2.5 | large amounts of precipitates |
| Comp. Ex. 3 | S-3 | R-3 | 4 or larger | coarse agglomeration |

*Dispersion state immediately after the preparation of latex particles.

The latex particles prepared from comparative dispersion stabilizing resins R-1, R-2 and R-3 are disadvantageous in that the particle sizes thereof are large and large amounts of precipitates are formed in the dispersion state thereof in comparison with the latex particles D-1 to D-9 prepared from the dispersion stabilizing resins of the present invention. Comparative latex particles could not be practically applied to the liquid developer.

Latex Particle Preparation Example 10 (D-10)

A mixed solution of 40 g of the dispersion stabilizing resin P-1, 53.8 g of methyl methacrylate, 46.2 g of methyl acrylate and 400 g of Isopar H was heated to 50° C. with stirring in a nitrogen gas stream. Subsequently, 6.6 g of 2,2'-azobis(2,4-dimethylvaleronitrile) was added thereto, and the mixture was reacted for 6 hours. The temperature was raised to 90° C. and the mixture was stirred for 2 hours to distill off unreacted monomers. After cooling, a white dispersion passed through 200-mesh nylon cloth was a latex having an average particle size of 0.19 μm with a conversion ratio of the monomers to the latex being 92%. After the white dispersion was left to stand for one month for storage, the dispersion state thereof was good.

Latex Particle Preparation Examples 11 to 14 (D-11 to D-14)

Latex particles were prepared in the same manner as in Latex Particle Preparation Example 10 except that each of the dispersion stabilizing resins indicated in Table 8 was used in place of the dispersion stabilizing resin P-1 used in Preparation Example 10. The results are shown in Table 8. The conversion ratios of the monomers to the particles were 90 to 95%.

TABLE 8

| Latex Preparation Example | Latex Particles | Dispersion Stabilizing Resin | Average Particle Size of Latex (μm) | Dispersion State* |
|---|---|---|---|---|
| 11 | D-11 | P-2 | 0.32 | good |
| 12 | D-12 | P-4 | 0.28 | " |
| 13 | D-13 | P-9 | 0.35 | " |
| 14 | D-14 | P-11 | 0.23 | " |

*Dispersion state after left to stand for one month for storage.

Latex Particle Preparation Examples 15 to 18 (D-15 to D-18)

Latex particles were prepared in the same manner as in Latex Particle Preparation Example 10 except that monomers indicated in Table 9 were used in place of methyl methacrylate and methyl acrylate used in Preparation Example 10. The results are shown in Table 9. The conversion ratios of the monomers to the particles were 90 to 95%. After each dispersion was left to stand for one month for storage, the dispersion state thereof was good.

TABLE 9

| Latex Preparation Example | Latex Particles | Monomer Component | | Average Particle Size of Latex (μm) |
|---|---|---|---|---|
| 15 | D-15 | methyl methacrylate 60.0 g | ethyl acrylate 40.0 g | 0.14 |
| 16 | D-16 | methyl methacrylate 75.8 g | butyl acrylate 24.2 g | 0.21 |
| 17 | D-17 | methyl methacrylate 58.7 g | butyl methacrylate 41.3 g | 0.11 |
| 18 | D-18 | ethyl methacrylate 66.6 g | methyl acrylate 33.4 g | 0.20 |

Latex Particle Preparation Example 19 (D-19)

The procedure of Latex Particle Preparation Example 10 was repeated except that 1.7 g of dimethylaminoethyl methacrylate in addition to methyl methacrylate and methyl acrylate was used as the monomer component. There was obtained a white dispersion having an average particle size of 0.14 μm with the conversion ratio of the monomers being 93%. After the dispersion was left to stand for one month for storage, the dispersion state thereof was good.

Comparative Latex Particle Preparation Examples 4 to 6 (S-4 to S-6)

Latex particles were prepared in the same manner as in Latex Particle Preparation Example 10 except that monomer components indicated in Table 10 were used in place of methyl methacrylate and methyl acrylate used in Preparation Example 10. The results are shown in Table 10. The conversion ratios of the monomers to the particles were 90 to 95%.

TABLE 10

| Latex Preparation Example | Latex Particles | Monomer Component | | Average Particle Size of Latex (μm) | Dispersion State |
|---|---|---|---|---|---|
| Comp. Ex. | | | | | |
| 4 | S-4 | methyl methacrylate 100 g | | 0.14 | pudding-like agglomeration |
| 5 | S-5 | methyl methacrylate 47.9 g | lauryl methacrylate 52.1 g | 0.32 | good |
| 6 | S-6 | methyl methacrylate 54.2 g | stearyl methacrylate 45.8 g | 0.24 | good |

EXAMPLE 1

The resin dispersion D-1 prepared in Latex Particle Preparation Example 1 was diluted with Isopar H in such an amount as to give 3 g/l on a resin basis. Subsequently, zirconium naphthenate as a charge controlling agent was added thereto in such an amount as to give a concentration of $1\times10^{-5}$ M, thus preparing a positively chargeable liquid developer.

Comparative Developers A and B

Liquid developers A and B for comparison were prepared in the same manner as in the preparation of the liquid developer described above except that each of the following resin dispersions were used in place of the resin dispersion used above.

Comparative liquid developer A:

The resin dispersion (S-5) prepared in Comparative Latex Particle Preparation Example 5.

Comparative liquid developer B:

The resin dispersion (S-6) prepared in Comparative Latex Particle Preparation Example 6.

The original plate for printing plate described hereinafter was positively charged with a corona charging device, imagewise exposed to light and then subjected to reversal development in a conventional manner by using these developers. The plate was heated to 120° C. for 10 minutes to fix an image.

The original plate for printing plate was immersed in an etching solution prepared by diluting 40 parts of potassium silicate, 10 parts of potassium hydroxide, 20 parts of benzyl alcohol and 20 parts of ethanol with 900 parts of water to remove non-image areas. The plate was thoroughly washed with water.

The resist property of the toner image areas was evaluated by measuring the resolving power of the resulting plate. The results are shown in Table 11.

TABLE 11

| No. | Test | Developer | Resolving Power lines/mm | Stability* of Developer |
|---|---|---|---|---|
| 1 | Invention | Example 1 | 35 to 40 | good |
| 2 | Comp. Ex. A | developer A | 2 to 4 | " |
| 3 | Comp. Ex. B | developer B | 1 to 2 | " |

*Dispersion state after left to stand for one month for storage

It is clear from the above results that comparative dispersed resin particles comprising methyl methacrylate alone is poor in dispersion stability and the liquid developer using the same can not be put to practical use. It is also apparent that when comparative dispersed resin particles comprising methyl methacrylate and an acrylate having an alkyl group having not less than 5 carbon atoms are used, the property as the resist in the etching solution is poor and resolving powder is inferior, though dispersion stability is good. On the other hand, when the dispersed resin particles of the present invention are used, it is apparent that dispersion stability as well as the property as the resist are superior.

Preparation of original plate for printing

The following coating solution for photoconductive layer was coated on a grained anodized aluminum sheet by means of a bar coater, and dried at 120° C. for minutes to prepare the original plate for printing with a coated film thickness of 3.0 μm.

| Coating solution for photoconductive layer | |
|---|---|
| 1. X type metal-free phthalocyanine | 15 parts |
| 2. Copolymer of benzyl methacrylate with methacrylic acid (methacrylic acid: 40 mol %) | 139 parts |
| 3. Thio barbituric acid derivative of the following formula 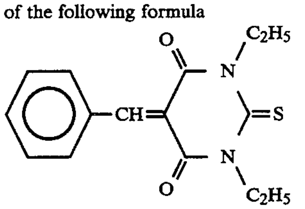 | 1.6 parts |
| 4. 1-Methoxy-2-propanol | 444 parts |
| 5. Methyl ethyl ketone | 666 parts |

A mixture having the above composition was uniformly dispersed (dispersion residence time: one hour) in dyno mill (KDL) to prepare the coating solution for photoconductive layer. The viscosity of the coating solution: 90 cps (ELD viscometer)

EXAMPLE 2

The procedure of Example 1 was repeated except that latex particles indicated in Table 12 were used in place of the white resin dispersion prepared in Latex Particle Preparation Example 1, and an octadecene-half maleic acid octadecylamide copolymer as a charge controlling agent was added in such an amount as to give 0.01 g of the copolymer/one liter of Isopar H. There was obtained each of liquid developers.

In the same manner as in Example 1, the original plate was exposed, developed by using these liquid developers and etched. The property as the resist of the plate was evaluated. Further, 3000 plates of the original plate were subjected to the above processing, and staining caused by the adhesion of toner to the developing apparatus was evaluated. The results are shown in Table 12.

TABLE 12

| Example | Latex Particles | Resolving Power lines/mm | Staining of Developing Apparatus | Stability* of Developer |
|---|---|---|---|---|
| 2 | D-2 | 36 to 39 | No staining | good |
| 3 | D-3 | 38 to 42 | " | " |
| 4 | D-4 | 37 to 40 | " | " |
| 5 | D-5 | 38 to 42 | " | " |
| 6 | D-6 | 34 to 40 | " | " |
| 7 | D-7 | 35 to 39 | " | " |
| 8 | D-8 | 34 to 36 | " | " |
| 9 | D-9 | 36 to 40 | " | " |
| 10 | D-10 | 35 to 38 | " | " |
| 11 | D-11 | 40 to 42 | " | " |
| 12 | D-12 | 38 to 40 | " | " |
| 13 | D-15 | 35 to 38 | " | " |
| 14 | D-16 | 33 to 36 | " | " |
| 15 | D-17 | 36 to 40 | " | " |
| 16 | D-18 | 30 to 35 | " | " |
| 17 | D-19 | 40 to 43 | " | " |

*Dispersed state after left to stand for one month for storage

It is apparent from Table 12 that the liquid developers of the present invention are excellent in the property as the resist and dispersion stability and do not cause staining by the adhesion of the toner to the developing apparatus. Further, images on the resulting printing plate are clear, and images on prints after 10,000 printing are very clear.

According to the present invention, toner images having resist with high fastness to etching solutions can be formed, and there can be obtained liquid developers which are excellent in dispersion stability and can be used and stored over a long period of time.

Further, staining by the adhesion of toner to the developing apparatus is not caused. Accordingly, the maintenance of the apparatus can be easily made. Further, there can be obtained liquid developers which give images having excellent resolving power and are excellent in image reproducibility.

While the invention has been described in detail and with reference to specific embodiments thereof, it will be apparent to one skilled in the art that various changes and modifications can be made therein without departing from the spirit and scope thereof.

What is claimed is:

1. A liquid developer useful for developing a latent image having been electrophotographically formed on a printing plate precursor into a toner image during manufacture of a printing plate, said printing plate precursor comprising an electrically conductive substrate having a hydrophilic surface and a layer containing an organic photoconductive compound on said hydrophilic surface, said toner image being fixed, and a non-image area of said layer other than said toner image area being removed by etching with an alkaline etching solution to provide said printing plate said liquid developer comprising resin particles dispersed in a non-aqueous solvent having a volume resistivity of at least $10^9$ Ωcm and having a dielectric constant less than 3, said dispersed resin particles being obtained by polymerizing:

(a) at least one monomer selected from the group consisting of methyl methacrylate and ethyl methacrylate soluble in said nonaqueous solvent; and (b) at least one monomer selected from the group consisting of alkyl acrylate wherein the alkyl group has up to 4 carbon atoms and butyl methacrylate, said alkyl acrylate and butyl methacrylate being soluble in said non-aqueous solvent, but being made insolubilized by polymerization;

said monomer (a) and said monomer (b) being polymerized in the presence of a dispersion stabilizing resin, said dispersion stabilizing resin being soluble in said non-aqueous solvent, said dispersion stabilizing resin comprising a graft copolymer formed by polymerizing:

(i) at least one macromonomer having a weight-average molecular weight of $1\times10^3$ to $4\times10^4$, said macromonomer having a polymerizable double bond and containing a group represented by the following formula (I) bonded to one terminal of a main polymer chain of said macromonomer, said macromonomer containing at least one moiety represented by the following formula (II) in said main polymer chain of said macromonomer; and (ii) at least one monomer represented by the following formula (III), wherein said monomers (a) and (b) are made insoluble by polymerization:

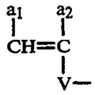

(I)

wherein V represents —COO—, —OCO—, $-(CH_2)_k-OCO-$, $-(CH_2)_k-COO-$, —O—, —CONHCOO—, —CONHNCO—, $-SO_2-$, —CO—, $-CONZ_1-$, $-SO_2NZ_1-$ or a phenylene group;

$Z_1$ represents a hydrogen atom or a hydrocarbon group;

k represents an integer of 1 to 3;

$a_1$ and $a_2$ may be the same or different and each represents a hydrogen atom, a halogen atom, a cyano group, a hydrocarbon group, $-COO-Z_2$ or $-COO-Z_2$ bonded through a hydrocarbon group; and $Z_2$ represents a hydrogen atom or a hydrocarbon group which may be substituted;

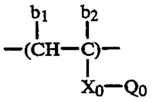

(II)

wherein $X_0$ represents —COO—, —OCO—, $-(CH_2)_k-OCO-$, $-(CH_2)_k-COO-$, —O—, —CONHCOO—, —COHNCO—, $-SO_2$, —CO—, $-CONZ_1-$, or $-SO_2NZ_1-$ or a bonding group comprising at least two combinations thereof;

Z1 has the same meaning as in formula (I);

$b_1$ and $b_2$ may be the same or different and each has the same meaning as $a_1$ and $a_2$ in formula (I);

k represents an integer of 1 to 3; and $Q_0$ represents an aliphatic group having 4 to 22 carbon groups;

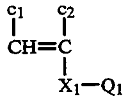

(III)

wherein $X_1$ has the same meaning as V in formula (I);

$Q_1$ represents a hydrogen atom, an aliphatic group having 1 to 22 carbon atoms or an aromatic group having 6 to 12 carbon atoms; and $c_1$ and $c_2$ may be the same or different and each has the same meaning as $a_1$ and $a_2$ in formula (I).

2. A liquid developer as in claim 1, wherein said dispersed resin particles are resin particles obtained by polymerizing (a) at least one monomer selected from the group consisting of methyl methacrylate and ethyl methacrylate, (b) at least one monomer selected from the group consisting of alkyl acrylate wherein the alkyl group has up to 4 carbon atoms and butyl methacrylate, and (c) at least one monomer of other copolymerizable monomers selected from the group consisting of vinyl monomers having a basic nitrogen atom and vinyl monomers having an amino group, in the presence of said dispersion stabilizing resin soluble in said non-aqueous solvent and comprising a graft copolymer.

3. A liquid developer as in claim 2, wherein said least one monomer of other copolymerizable monomers is selected from the group consisting of aminoalkylsubstituted (meth)acrylates represented by the following formula (IV), quaternary salts of aminoalkyl-substituted (meth)acrylates represented by the following formula (V), N-vinylimidazole, N-vinyl-2-methylimidazole, 1-vinylpyrrole, N-β-acryloxy-ethylindole, 2-vinylquinoline, 4-vinylpyridine, 5-vinyl-4-methylthiazole, 3-methyl-5-isopropenylpyrazole, N-vinyl-2-pyrrolidone, N-vinylpiperidone, N-vinyloxazolidone, dimethylaminostyrene, dialkylaminomethyl-styrenes, quaternary salts of dialkylaminomethylstyrenes and (meth)acrylamide;

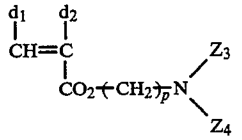

(IV)

wherein $d_1$ and $d_2$ may be the same or different and each represents a hydrogen atom or D methyl group;

$Z_3$ and $Z_4$ may be the same or different and each has the same meaning as $Z_1$ in formula (I); and p represents an integer of 1 to 3;

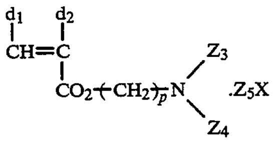

(V)

wherein $d_1$, $d_2$, p, $Z_3$ and $Z_4$ each has the same meaning as defined above in formula (IV);

$Z_5$ represents an alkyl group having 1 to 18 carbon atoms or an aralkyl group having 7 to 24 carbon atoms; and X represents a halogen atom, an acetate group, $BF_4$, a sulfate group, p-toluenesulfonate or an alkylsulfonate group.

4. A liquid developer as in claim 2, wherein said monomer (c) comprises up to 30 mol % of said resin particles based on the total amount of monomers (a), (b) and (c).

5. A liquid developer as in claim 1, wherein said monomer is (b) present in an amount of 0.1 to 9 mol per mol of said monomer (a).

6. A liquid developer as in claim 1, wherein said dispersed resin particles are obtained by polymerizing at least one combination of said monomers (a) and (b) selected from the group consisting of: a combination of (a) methyl methacrylate and (b) methyl acrylate; a combination of (a) methyl methacrylate and (b) ethyl acrylate; a combination of (a) methyl methacrylate and (b) propyl acrylate; a combination of (a) methyl methacrylate and (b) butyl acrylate; a combination of (a) methyl methacrylate and (b) butyl methacrylate; and a combination of (a) ethyl methacrylate and (b) methyl acrylate.

* * * * *